US009211645B2

(12) United States Patent
Ahn et al.

(10) Patent No.: US 9,211,645 B2
(45) Date of Patent: Dec. 15, 2015

(54) APPARATUS AND METHOD FOR SELECTING LASTING FEELING OF MACHINE

(71) Applicant: KOREA INSTITUTE OF INDUSTRIAL TECHNOLOGY, Cheonan (KR)

(72) Inventors: Ho Seok Ahn, Incheon (KR); Dong Wook Lee, Incheon (KR); Woong Hee Shon, Seongnam (KR)

(73) Assignee: Korea Institute of Industrial Technology, Cheonan (KR)

( * ) Notice: Subject to any disclaimer, the term of this patent is extended or adjusted under 35 U.S.C. 154(b) by 283 days.

(21) Appl. No.: 13/714,355

(22) Filed: Dec. 13, 2012

(65) Prior Publication Data

US 2014/0172163 A1 Jun. 19, 2014

(51) Int. Cl.
*G06N 5/00* (2006.01)
*B25J 11/00* (2006.01)

(52) U.S. Cl.
CPC ........... *B25J 11/001* (2013.01); *A63H 2200/00* (2013.01)

(58) Field of Classification Search
CPC .............. G06N 3/008; G06F 17/30598; G06F 17/5022; G06F 21/554; A63H 2200/00; G06K 9/00221; G06K 9/00335; Y10S 901/01
See application file for complete search history.

(56) References Cited

U.S. PATENT DOCUMENTS

| 6,484,068 | B1 * | 11/2002 | Yamamoto et al. | 700/245 |
|---|---|---|---|---|
| 6,560,511 | B1 * | 5/2003 | Yokoo et al. | 700/245 |
| 7,065,490 | B1 * | 6/2006 | Asano et al. | 704/275 |
| 2002/0156751 | A1 * | 10/2002 | Takagi et al. | 706/12 |
| 2002/0183896 | A1 * | 12/2002 | Ogure et al. | 700/245 |
| 2003/0144764 | A1 * | 7/2003 | Yokono et al. | 700/245 |
| 2004/0015265 | A1 * | 1/2004 | Asano et al. | 700/245 |
| 2004/0093118 | A1 * | 5/2004 | Sabe et al. | 700/245 |
| 2007/0150099 | A1 * | 6/2007 | Lee et al. | 700/245 |
| 2007/0168894 | A1 * | 7/2007 | Iwashita | 716/4 |
| 2009/0248372 | A1 * | 10/2009 | Ryu et al. | 703/2 |
| 2009/0285456 | A1 * | 11/2009 | Moon et al. | 382/118 |
| 2013/0216098 | A1 * | 8/2013 | Hasegawa et al. | 382/103 |
| 2014/0093849 | A1 * | 4/2014 | Ahn et al. | 434/236 |
| 2014/0095570 | A1 * | 4/2014 | Ahn et al. | 708/523 |
| 2014/0170619 | A1 * | 6/2014 | Ahn et al. | 434/236 |
| 2014/0172163 | A1 * | 6/2014 | Ahn et al. | 700/245 |
| 2014/0172771 | A1 * | 6/2014 | Ahn et al. | 706/52 |

OTHER PUBLICATIONS

Ahn et al., "Natural changing of emotional expression by considering correlation of behavior history", Jun. 17, 2011, Consumer Electronics (ISCE), IEEE 15th International Symposium on Consumer Electronics, pp. 369-372, doi: 10.1109/ISCE.2011.5973851, URL: http://ieeexplore.ieee.org/stamp/stamp.jsp?tp=&arnumber=5973851&isnumber=5973167.*

(Continued)

*Primary Examiner* — Jeffrey A Gaffin
*Assistant Examiner* — Paulinho E Smith
(74) *Attorney, Agent, or Firm* — Novick, Kim & Lee, PLLC; Jae Youn Kim

(57) ABSTRACT

An optimal behavior combination of a robot in consideration of the robot's previous feeling is generated. In other words, the robot may express its feelings by combinations of its behavioral express elements which reflect its previous feelings. In particular, it has a continuity determination unit for determining whether a behavior to be expressed should be same as or different from a currently expressed behavior.

8 Claims, 6 Drawing Sheets

(56) References Cited

OTHER PUBLICATIONS

Lee et al., "A General Behavior Generation Module for Emotional Robots Using Unit Behavior Combination Method", Oct. 2, 2009, The 18th IEEE International Symposium on Robot and Human Interactive Communication, pp. 375-380.*

Ahn et al, "Can We Teach What Emotions a Robot Should Express?", Oct. 12, 2012, International Conference on Intelligent Robots and Systems, pp. 1407-1412.*

Ahn et al., "A Behavior Combination Generating Method for Reflecting Emotional Probabilities using Simulated Annealing Alogorithm", Aug. 3, 2011, 20th IEEE Internation Symposium on Robot and Human Interactive Communications, pp. 192-197.*

* cited by examiner

| Expression Part ($p$) | Unit Behavior | | Probability ($\bar{e}_{p,w_p,j}$) | | | |
|---|---|---|---|---|---|---|
| | name | Index ($w_p$) | Happiness ($j=1$) | Sadness ($j=2$) | Surprise ($j=3$) | Angry ($j=4$) |
| Mouth ($p=1$) | Neutral | ($w_1=1$) | 0 | 0 | 0 | 0 |
| | Smile | ($w_1=2$) | 1 | 0 | 0 | 0 |
| | Open | ($w_1=3$) | 1/3 | 0 | 1/2 | 1/6 |
| | Close | ($w_1=4$) | 0 | 2/3 | 0 | 1/3 |
| | Shake | ($w_1=5$) | 0 | 1/3 | 1/6 | 1/2 |
| | Frown | ($w_1=6$) | 0 | 1/3 | 0 | 2/3 |
| Eyes ($p=2$) | Neutral | ($w_2=1$) | 0 | 0 | 0 | 0 |
| | Close Both | ($w_2=2$) | 1/6 | 1/2 | 0 | 1/3 |
| | Close Left | ($w_2=3$) | 1 | 0 | 0 | 0 |
| | Open Both | ($w_2=4$) | 1/3 | 0 | 2/3 | 0 |
| | Big | ($w_2=5$) | 1/3 | 0 | 2/3 | 0 |
| | Frown | ($w_2=6$) | 0 | 1/3 | 0 | 2/3 |
| Head ($p=3$) | Neutral | ($w_3=1$) | 0 | 0 | 0 | 0 |
| | Nod | ($w_3=2$) | 1 | 0 | 0 | 0 |
| | Swing | ($w_3=3$) | 0 | 2/3 | 0 | 1/3 |
| | Tilt | ($w_3=4$) | 0 | 1/3 | 0 | 2/3 |
| | Back | ($w_3=5$) | 0 | 0 | 2/3 | 1/3 |
| | Down | ($w_3=6$) | 0 | 1 | 0 | 0 |

FIG. 3

| Expression Part ($p$) | Unit Behavior | | Priority | | | |
|---|---|---|---|---|---|---|
| | name | Index ($w_p$) | Happiness ($j$=1) | Sadness ($j$=2) | Surprise ($j$=3) | Angry ($j$=4) |
| Mouth ($p$=1) | Neutral | ($w_1$=1) | * | × | * | * |
| | Smile | ($w_1$=2) | 1 | × | * | * |
| | Open | ($w_1$=3) | 2 | × | 1 | 3 |
| | Close | ($w_1$=4) | × | 1 | × | 2 |
| | Shake | ($w_1$=5) | × | 2 | 3 | 1 |
| | Frown | ($w_1$=6) | × | 2 | × | 1 |
| Eyes ($p$=2) | Neutral | ($w_2$=1) | * | × | * | * |
| | Close Both | ($w_2$=2) | 3 | 1 | * | 2 |
| | Close Left | ($w_2$=3) | 1 | × | * | * |
| | Open Both | ($w_2$=4) | 2 | × | 1 | × |
| | Big | ($w_2$=5) | 2 | × | 1 | × |
| | Frown | ($w_2$=6) | × | 2 | × | 1 |
| Head ($p$=3) | Neutral | ($w_3$=1) | * | × | * | * |
| | Nod | ($w_3$=2) | 1 | × | * | * |
| | Swing | ($w_3$=3) | * | 1 | * | 2 |
| | Tilt | ($w_3$=4) | × | 2 | × | 1 |
| | Back | ($w_3$=5) | × | * | 1 | 2 |
| | Down | ($w_3$=6) | × | 1 | × | × |

FIG. 4

APPARATUS AND METHOD FOR SELECTING LASTING FEELING OF MACHINE

BACKGROUND OF THE INVENTION

1. Field of the Invention

Exemplary embodiments of the present invention relates to an apparatus and a method for selecting lasting feeling of a machine, and more particularly, to an apparatus and a method for expressing current feeling continued to feeling expressed at just previous time.

2. Description of Related Art

It is difficult to consider smiling just immediately crying as realistic feeling expression Therefore, even in the case of a robot, there is continuity between respective feeling expressions so as to express the realistic expression.

In particular, when randomly taking another feeling expression for the same feeling in order to give naturalness to the feeling expression of a robot, it is highly likely to violate the continuity. Therefore, there is a need to provide time series continuity to some degree at the time of the feeling expression.

SUMMARY OF THE INVENTION

An embodiment of the present invention is directed to an apparatus and a method for selecting lasting feeling of a machine for feeling expressed at just previous time and current feeling expression having continuity.

Objects of the embodiment of the present invention are not limited the above-mentioned objects and other objects may be apparently understood to a person skilled in the art to which the present invention pertains from the following description.

An apparatus for selecting lasting feeling of a machine includes: an behavior combination extraction unit configured to extract behavior combinations expressing feelings of a machine; and a continuity determination unit configured to determine whether a behavior expressed at a just previous time is the same as a currently expressed behavior for each feeling expression element of a machine configuring the extracted behavior combinations and when a difference between the behavior of the feeling expression elements expressed at the just previous time and the behavior of the currently expressed feeling expression elements is larger than a setting value, allows the behavior combination extraction unit to extract a new behavior combination.

The apparatus for selecting lasting feeling of a machine may further include: a setting value calculation unit configured to calculate the setting value so as to be in proportion to a difference between an feeling value indicating the feeling of the machine expressed at the just previous time and an feeling value indicating the feeling of the currently expressed feeling of the machine.

The feeling value may be a composite feeling configured of a plurality of detailed feelings, and the difference between the previous feeling value and the current feeling value may be any one of a maximum value, a minimum value, an average value, an middle value, and a value set by a user among the differences between the detailed feelings.

The setting value may be in proportion to coefficients selected by a user.

The setting value may be in proportion to the number of feeling expression elements of the machine.

The difference between the behavior of the feeling expression elements expressed at the just previous time and the behavior of the currently expressed feeling expression elements may be calculated according to the following Equation:

$$\text{count}(b(k-1), b_{can}(k)) \le l,$$

where $$\text{count}(b(k-1), b_{can}(k)) = \sum_{p=1}^{P} \text{comparison}(b_p(k-1), b_{can\,p}(k))$$

and, $$\text{comparison}(b_p(k-1), b_{can\,p}(k)) = \begin{cases} 1, & \text{if } (b_p(k-1) \ne b_{can\,p}(k)) \\ 0, & \text{otherwise} \end{cases},$$

$b_p(k-1)$ is an feeling expression behavior of a p-th feeling expression element in the behavior combinations of the feeling expression element expressed at the just previous time (k−1 time), $b_{can\,p}(k)$ is the feeling expression behavior of the p-th feeling expression element in the feeling expression element expressed at a current time (k time), and l is a set value.

A method for selecting lasting feeling of a machine, includes: extracting behavior combinations expressing feelings of a machine; and determining whether a behavior expressed at a just previous time is the same as a currently expressed behavior for each feeling expression element of a machine configuring the extracted behavior combinations and when a difference between the behavior of the feeling expression elements expressed at the just previous time and the behavior of the currently expressed feeling expression elements is larger than a setting value, extracting a new behavior combination.

BRIEF DESCRIPTION OF THE DRAWINGS

FIG. 3 is a schematic diagram illustrating a table in which probability values for each feeling for feeling expression behaviors for each element are set.

FIG. 4 is a schematic diagram illustrating a table in which priorities for each feeling for feeling expression behaviors for each element are set by a user.

DESCRIPTIONS OF PREFERRED EMBODIMENTS

Hereinafter, an apparatus and a method for expressing continued feeling in accordance with embodiments of the present invention will be described in more detail with reference to the accompanying drawings.

Prior to full description of the apparatus for expressing continued feelings, a scheme of a robot feeling expression will be described so as to help understanding.

In order for a robot to express an feeling, a current feeling value of a robot needs to be calculated. The case in which an feeling is decided as one detailed feeling such as happiness, sadness, and the like, is infrequent. Even when a man currently feels happiness, other feelings, such as feeling of fright, feeling of surprise, and the like, are partially reflected. That is, feeling expressions are results obtained by reflecting composite detailed feelings. Therefore, in order to implement realistic feeling expressions by a robot, feeling values that are applied to a robot may be represented by a vector, while reflecting various detailed feelings such as happiness, sadness, surprise, anger, and the like.

Figure 1:
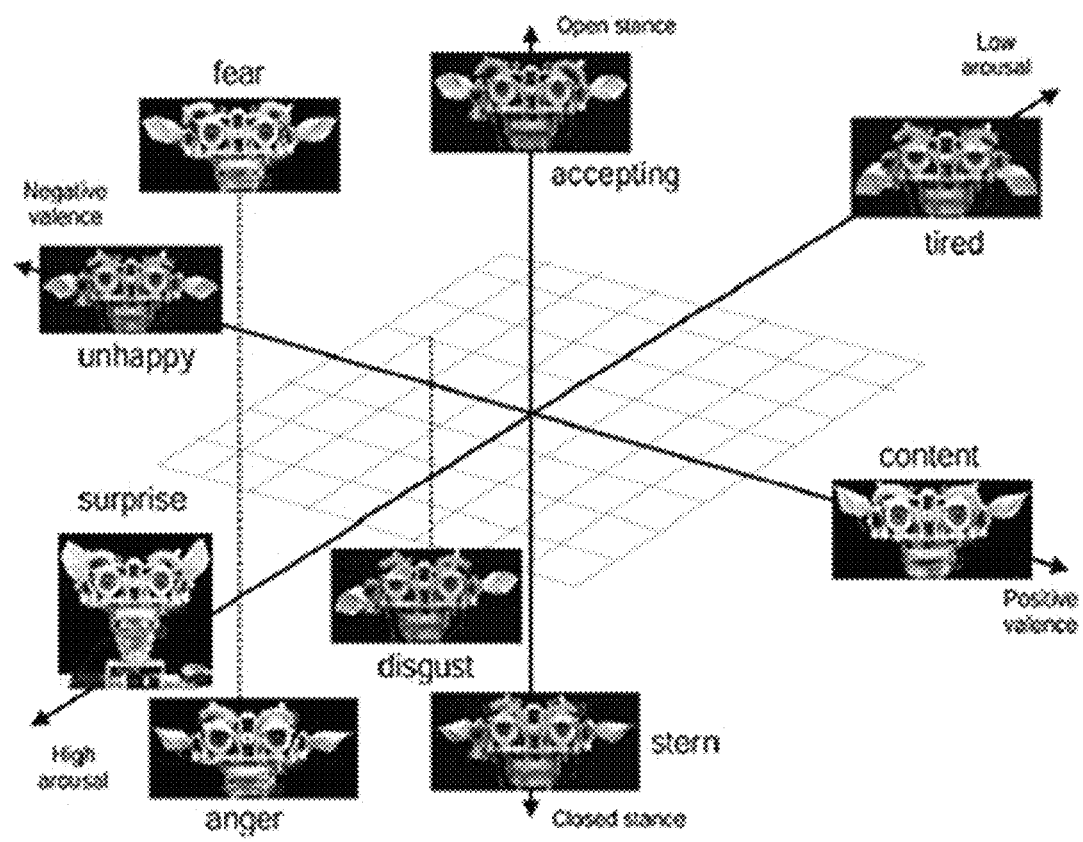
FIG. 1 is a schematic diagram illustrating a general feeling expression method of a machine.

FIG. 1 is a schematic diagram illustrating a general feeling expression method of a robot. In order to express an feeling of a robot, a space of a fixed dimension such as two-dimension or three-dimension is generally used and feeling is mapped to a predetermined location on the fixed dimensional space. The feeling values can be represented and calculated by a vector value corresponding to the predetermined locations on the space.

That is, when the feelings are mapped to several points on a vector space and the specific feeling vector is given, a method for selecting and expressing the specific feeling vector and one of feelings nearest to several feelings mapped on the vector space is performed.

In other words, since there is a limitation in manually mapping feelings to infinite coordinates on the vector space, the method in accordance with the related art illustrated in FIG. 1 selects few coordinates, maps feelings corresponding to each coordinate, feeling expression behaviors corresponding to the feelings, and analyzes the feeling values of a robot to select the feelings of the nearest coordinates, thereby performing the feeling expressions.

For example, feeling values 1 {happiness 1, sadness 0, surprise 0, anger 0} are set to coordinate 1 on a four-dimensional vector space and when feeling values 2 {happiness 3/4, sadness 1/4, surprise 0, anger 0} and feeling values 3 {happiness 3/4, sadness 0, surprise 1/4, anger 0} are closer to coordinate 1 than a coordinate expressing other feelings, all of the feeling values 1, 2, and 3 perform feeling expressions set to coordinate 1.

As such, according to the method of the related art, even though the actually generated feeling values are different internally, the selected feeling values selects only the most similar one of the feeling values mapped to the coordinate 1 and since the feeling expression behaviors are selected based on the feeling values on the same coordinates, a type expressed by an expression organ is generally the same.

Figure 2:
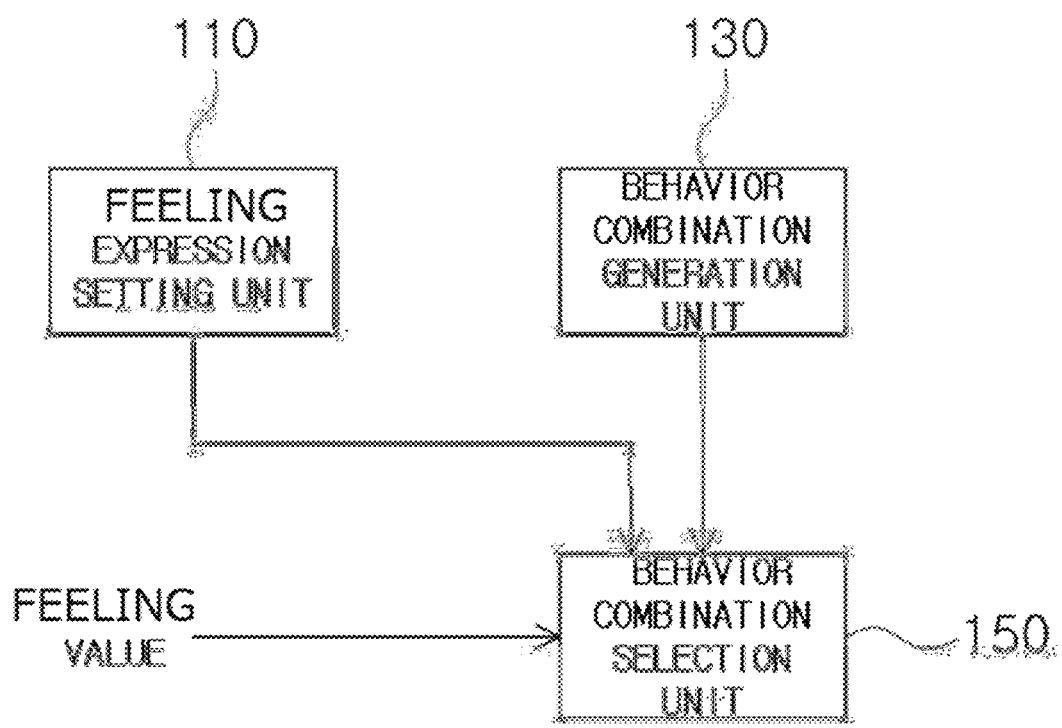
FIG. 2 is a block diagram illustrating an apparatus for selecting feeling expression behaviors in accordance with an embodiment of the present invention.

FIG. 2 is a block diagram illustrating an apparatus for selecting feeling expression behaviors.

As illustrated in FIG. 2, the apparatus for selecting feeling expression behaviors includes an feeling expression setting unit 110 that sets a probability of each feeling expression behavior performed for each expression element of a robot for each predetermined feeling, a behavior combination generation unit 130 that randomly extracts the feeling expression behaviors one by one from each expression element to generate the combinations of combined behaviors, and a behavior combination selection unit 150 that calculates an average of probabilities of the feeling expression behaviors included in each behavior combination for each feeling and selects from each behavior combination the behavior combinations in which the average most approximates the feeling values of a robot.

The feeling expression setting unit 110 sets the probabilities of the feeling expression behaviors performed for each expression element of a robot.

The expression elements of a robot are individual behavior elements or feeling expression elements that can be operated by a robot capable of visually or audibly recognizing the behavior of a robot from the outside. For example, eyes, mouth, ears, head, hand, foot, and the like, correspond to the elements of a robot. The expression elements of a robot may also include a speaker displaying feeling sound such as laughing, crying, and the like.

The feeling expression setting unit 110 defines the behaviors (hereinafter, referred to as feeling expression behaviors) associated with the feeling expression in various behaviors of each expression element and sets the probabilities for each feeling for each feeling expression behavior.

The feeling expression setting unit 110 sets the probabilities for each feeling (detailed behavior) as illustrated in FIG. 3 in connection with the feeling expression behaviors. As illustrated in FIG. 3, the feeling expression behaviors of neutral, smile, open, close, shake, frown are defined for a mouth and six expression behaviors are each defined for eyes and head. Further, the number of feeling expression behaviors of each expression element may not be the same.

The feeling expression setting unit 110 sets the probabilities for each detailed feeling for open. In detail, happiness may be set to be 2/6=1/3, sadness may be set to be 0, surprise may be set to 3/6=1/2, and anger may set to be 1/6. The probabilities are set for all the behaviors for each element. As illustrated in FIG. 3, the number and probability of detailed feelings relating to happiness, sadness, surprise, and angry may be set by a user. When a user directly sets the probabilities, the feeling expression setting unit 110 may perform a function of database in which the probabilities for each feeling for the feeling expression behaviors of each expression element are stored in a table.

Meanwhile, it may be difficult for a user to directly set the probabilities and as a result, a user simply sets only priorities and the priorities set by the feeling expression setting unit 110 may be transformed into the probabilities.

FIG. 4 illustrates a table in which priorities for each feeling for the feeling expression behaviors for each element are set by a user.

The feeling expression setting unit 110 may use the following Equation 1 so as to transform the priorities of FIG. 4 into the probabilities of FIG. 3.

$$\bar{e}_{p,w_p,j} = 0 \qquad \text{[Equation 1]}$$

when feelings are not associated with behaviors of expression elements, but $$\bar{e}_{p,w_p,j} = \frac{(r_{p,w_p,\max} - r_{p,w_p,j} + 1)}{r_{p,w_p,sum}}$$

when feelings are associated with behaviors of expression elements.

In above Equation 1, $\bar{e}_{p,w_p,j}$ is a probability value of j-th feeling for a $w_p$-th feeling expression behavior in a p-th element, $r_{p,w_p,j}$ is a priority of a j-th feeling for a $w_p$-th feeling expression behavior in a p-th element, $r_{p,w_p,\max}$ is the largest value of priorities of j-th feeling for a $w_p$-th feeling expression behavior in a p-th element, and $r_{p,w_p,sum}$ is a sum of priorities of all the feelings for a $w_p$-th feeling expression behavior in a p-th element.

In FIG. 4, the priority of the mouth open is that surprise is selected as a top rank, happiness is selected as second rank, and anger is selected as third rank. When this is applied to Equation 1, the mouth open happiness becomes (3−2+1)/6=1/3. The mouth open sadness is 0 due to the absence of priority. The mount open surprise becomes (3−1+1)/6=1/2. The mount open anger becomes (3−3+1)/6=1/6. This coincides with FIG. 3.

The behavior combination generation unit 130 randomly extracts and combines the feeling expression behaviors in each expression element one by one to generate the behavior combinations. The behavior combination is a set of the feeling expression behaviors of each expression element operated at the time of expressing the feelings. For example, the behavior combinations may be made by extracting the open behavior from the mouth that is the expression element, the big behavior from eyes that is the expression element, and the back behavior from a head that is the expression element. The probabilities (value) of the combinations are listed as follows in an order of happiness, sadness, surprise, and anger.

| Mouth | | 1/3 0 | 1/2 1/6 |
|---|---|---|---|
| Eye | 1/3 0 | | 2/3 0 |
| Head | 0 0 | | 2/3 1/3 |

The behavior combination generation unit 130 may generate at least one behavior combination.

Randomly extracting the feeling expression behavior is to perform various feeling expression behaviors for the same feeling values, which will be described below.

Next, the behavior combination selection unit 150 first obtains an average for each feeling for the probabilities of the feeling expression behaviors included in the behavior combinations.

That is, in the case of the combinations of the mouth open-eye big-head back behaviors, the average of the happiness is set to be (1/3+1/3+0)/3=2/9, the average of sadness is set to be 0, the average of surprise is set to be (1/2+2/3+2/3)/3=11/18, and the average of anger is set to be (1/6+0+1/3)/3=1/6.

Next, the calculated average value is compares with the input feeling value of a robot. When the feeling values of a robot are a vector of a {happiness, sadness, surprise, anger} type, the average values calculated so as to be compared with each other are vectorized like {2/9, 0, 11/18, 1/6}.

Next, the behavior combination selection unit 150 calculates a distance between two vectors. When there are the plurality of behavior combinations, the distance to the feeling values of a robot is obtained based on the average values for each feeling for each behavior combination as described above and the behavior combinations in which the average (vector) having the smallest distance is selected. The selected behavior combinations are transmitted to the control unit that controls each element, such that the robot may express the natural feeling. Making the distance between two vectors smallest represent the nearest.

The behavior of the behavior combination selection unit 150 may be defined by the following Equation 2. The following Equation recalls one example of describing the behavior of the behavior combination selection unit 150.

[Equation 2]

$$b(k) = \arg \min_{[w_1 \, w_2 \, \ldots \, w_p \, w_P]^T} \left\| e(k) - \frac{1}{P} \sum_{p=1}^{P} \bar{e}_{p,w_p} \right\|$$

In above Equation 2, e(k) is a feeling value (vector) of a robot that is to be expressed at k time, P is a total number of feeling elements of a robot, $\bar{e}_{p,w_p}$ is an feeling value (vector) of a $w_p$-th feeling expression behavior in a p-th element, $\| \, \|$ is a size of a vector (inter-vector distance), min is an operator that selects a minimum value from a plurality of values, $\arg_{[w_1 w_2 \ldots w_p \ldots w_P]^T}$ is an operator that indicates factors $w_1$, $w_2, \ldots w_p, \ldots$, $w_P$ used to derive values as a transposed matrix, and b(k) is a behavior combination selected as one most approximating the feeling values of a robot.

According to the existing feeling expression scheme, a robot may express the feelings based on only few combinations that are previously defined, but in accordance with the above configuration, may express the feelings based on several behavior combinations that are the expression elements at the time of using all the extractable behavior combinations (the number of branches of the feeling expression behaviors allocated to the expression elements).

Further, when the behavior combination generation unit 130 randomly extracting the feeling expression behaviors generates only a part of the behavior combinations rather than all the behavior combinations, other behavior combinations for the same feeling values may be selected. Therefore, more natural feeling expression can be performed. For example, in the case of human, when the happiness feeling is expressed, a mouth may be tilted instead of smile and in accordance with the above configuration, the randomness of the so-called feeling expression may be implemented.

In order to exhibit the randomness of the feeling expression, the next scheme may be additionally considered.

When the average most approximating the feeling value of a robot is an approximation average, the behavior combination selection unit 150 calculates the averages in an order of the behavior combinations input from the behavior combination generation unit 130 and when a difference between the currently calculated average and the approximation average satisfies the randomness in the case in which the currently calculated average is not the approximation average up to now, the currently calculated average may be selected as the approximation average up to now.

In accordance with the above description, the behavior combination selection unit 150 does not have an interest in the corresponding behavior combinations when the currently calculated average is not the approximation average up to now. The reason is that there is no need to select the current behavior combinations when there are the behavior combinations more approximating the feeling values. Therefore, when the currently calculated average is not the approximation average, the currently calculated average may be discarded as being considered as dummy.

However, when intending to select various behavior combinations for the same feelings, it is possible to additionally give an opportunity of being selected as the approximation average to the currently calculated average, rather than the approximation average up to now.

To this end, the behavior combination selection unit 150 determines whether the difference between the currently calculated average and the approximation average satisfies the randomness. In this case, the randomness signifies that a randomly selected constant is a reference.

That is, various schemes determining whether the difference between the currently calculated average and the approximation average satisfies the randomness based on the randomly selected constant a reference may be provided.

The difference between the currently calculated average and the approximation average may include an indirect subtraction in addition to a direct subtraction. The example may determine whether the randomness is satisfied as the following Equation 3.

$$P_A(k) > \text{random}(0,1) \qquad \text{[Equation 3]}$$

In the above Equation 3, $$P_A(k) = e^{\frac{1}{Z}(\text{error}(b_{best}(k)) - \text{error}(b_{can}(k)))},$$

random (0, 1) is a random value between 0 and 1,

Z is a value reduced whenever a repeated value is counted as an ending constant, error ($b_{best}(k)$) is a size of a difference between the optimal behavior combinations and the feeling values of a robot, and error ($b_{can}(k)$) is as a size of a difference between the behavior combinations and the feeling values of a robot, $$\text{error}(b_{can}(k)) = \left\| e(k) - \frac{1}{P}\sum_{p=1}^{P} \overline{e}_{p,w_p} \right\|.$$

In the above Equation 3, a difference between the calculated average and the approximation average is represented by PA (k) and a value between 0 and 1 is used as a random constant.

The ending constant Z will be described below as one associated with the repeated value, that is, the repeated frequency.

Figure 5:
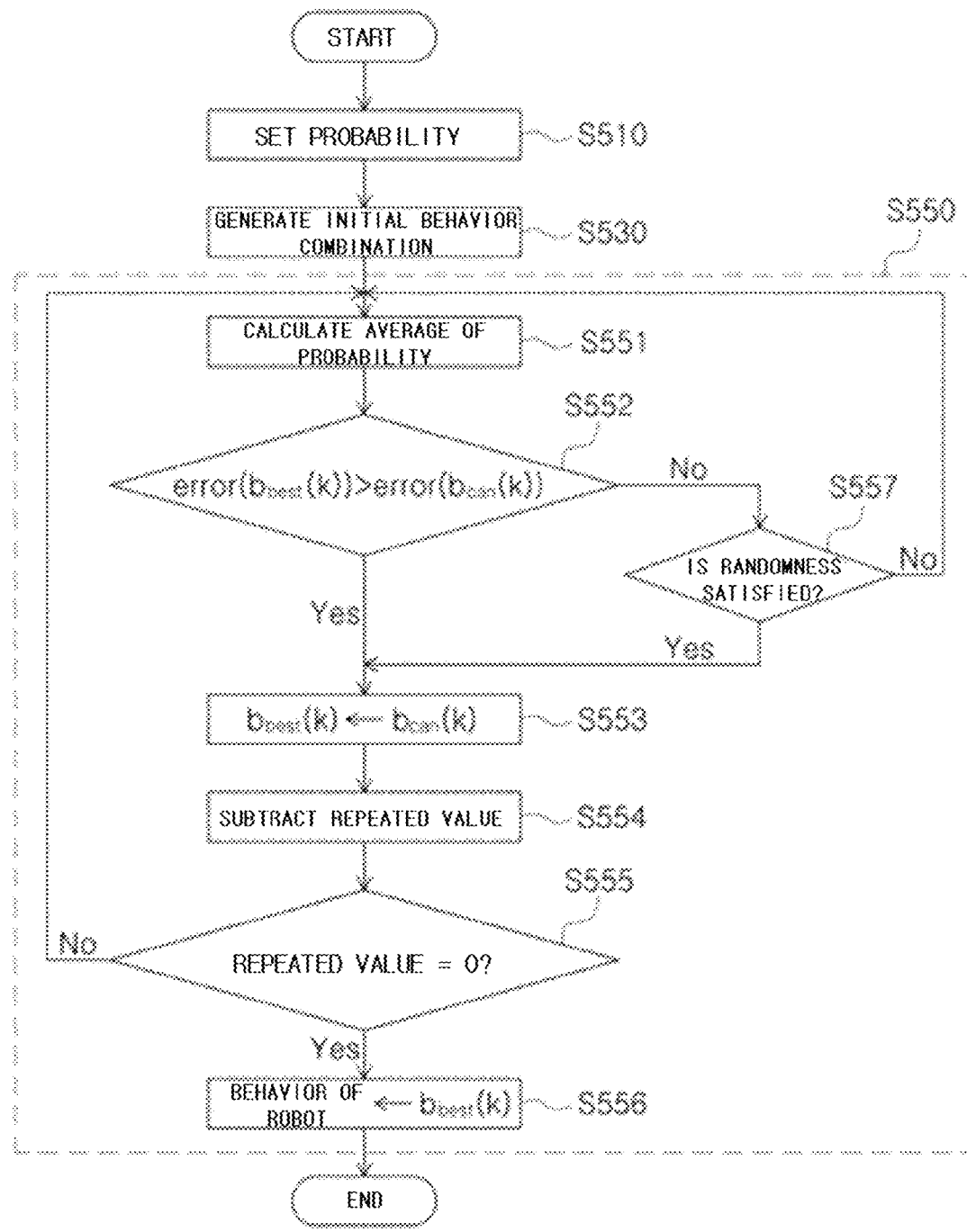
FIG. 5 is a flow chart illustrating a method for selecting feeling expression behaviors in accordance with an embodiment of the present invention.

FIG. 5 is a flow chart illustrating a method for selecting feeling expression behaviors.

The method for selecting feeling expression behaviors illustrated in FIG. 5 may be described as a description of an operation of the apparatus for selecting feeling expression behaviors illustrated in FIG. 2.

First, a probability of each feeling expression behavior performed for each expression element of a robot for each predetermined feeling is set (S510). In the feeling expression setting unit 110, a user previously sets each feeling corresponding to a behavior expressed in the feeling expression element of a robot. As described above, the setting may be set in an order of feelings according to the probability value for the feeling expression element or the expression behavior.

Next, at least one behavior combination is generated by randomly extracting the feeling expression behaviors from each expression element one by one (S530). This is a behavior that is performed by the behavior combination generation unit 130.

The average of the probabilities of the feeling expression behaviors included in the behavior combinations is calculated for each feeling and the behavior combinations in which the average most approximate the feeling value of a robot is selected from the behavior combinations (S550). The behavior performed by the behavior combination selection unit 150 may be selected as the behavior combinations according to Equation 2 by way of example.

Here, a step of selecting the behavior combinations will be described below in detail.

a) The probability of each feeling expression behavior performed for each element of a robot for each predetermined feeling is set (S510). The priority may be transformed into the probability as the above Equation 1 in consideration of convenience of user.

b) The initial behavior combination is generated by extracting the feeling expression behaviors most approximating the feeling values of a robot for each element (S530).

The initial behavior combination $b_{init}$ may be defined by the following Equation 4.

$$b_{init} = [w_1 \ w_2 \ \ldots \ w_p \ \ldots \ w_P]^T \in R^P \qquad \text{[Equation 4]}$$

$$w_p = \underset{w_p}{\text{argmin}} \left\| e(k) - \overline{e}_{p,w_p} \right\|$$

In the above Equation 4, $$w_p = \underset{w_p}{\text{argmin}} \left\| e(k) - \overline{e}_{p,w_p} \right\|,$$

$R^P$ represents a P-dimensional vector that uses a real number as a component. That is, the $b_{init}$ is represented by the P-dimensional vector and uses a real number as a component.

c) The behavior combinations are generated by randomly extracting the feeling expression behaviors from each element one by one and the average of the probabilities of the feeling expression behaviors included in the behavior combinations is calculated for each feeling (S551).

The generated behavior combination b(k) may be defined by the following Equation 5.

$$b_{can}(k) = [w_1 w_2 \ldots w_p \ldots w_P]^T \in R^P \qquad \text{[Equation 5]}$$

In the above Equation 5, the $b_{can}(k)$ is a combination of the randomly extracted feeling expression behaviors and therefore, there is no clue like $$w_p = \underset{w_p}{\text{argmin}} \left\| e(k) - \overline{e}_{p,w_p} \right\|$$

according to Equation 4.

d) It is determined which of the average of the probabilities and the optimal behavior combination $b_{best}(k)$ using the initial behavior combination as an initial value more approximates the feeling values of a robot (S552).

In this case, the Equation used for determination may be defined by the following Equation 6.

$$\text{error}(b_{best}(k)) > \text{error}(b_{can}(k)) \qquad \text{[Equation 6]}$$

In the above Equation (6)

$$\text{error}(b_{can}(k)) = \left\| e(k) - \frac{1}{P}\sum_{p=1}^{P} \overline{e}_{p,w_p} \right\|,$$

and at the initial of the determination, error($b_{best}(k)$)=∥e(k)−$b_{init}$∥,and in step e), when substitution is performed, error ($b_{best}(k)$) error ($b_{can}k(k)$).

e) When the average of the probabilities more approximate the feeling values of a robot, that is, satisfies Equation 6, the optimal behavior combination $b_{best}(k)$ is substituted into the behavior combination $b_{can}(k)$ of the average of the probabilities (S553) ($b_{best}(k) \leftarrow b_{can}(k)$) and when the repeated value is subtracted (S554) and then, the repeated value is 0 (S555), the optimal behavior combination is selected as the behavior of a robot (S556) and otherwise, it returns to the step c).

The repeated value may be set by various schemes, Equations, and constants.

For example, when the ending constant Z and the ending reference $\epsilon$ are set and satisfy the following Equation 7, the repeated value may be processed as 0.

$$Z < \epsilon \quad \text{[Equation 7]}$$

In the above Equation 7, the initial Z is a real number larger than $\epsilon$, the subtraction of the repeated value substitutes Z into $\xi Z$, and $$0 < \xi < 1.$$

The ending constant Z of Equation 3 may be the ending constant of Equation 7. In this case, as the repeated frequency is increased, the probability that the currently calculated average satisfies the above Equation 3 is increased.

f) When the optimal behavior combination more approximates the feeling value of a robot, it is determined whether the difference between the behavior combination of the average of the probabilities and the optimal behavior combination satisfies the randomness (S557). The randomness may be determined according to Equation 3.

g) When satisfying the randomness, the optimal behavior combination is substituted into the behavior combination (S553) and when the repeated value is subtracted (S554) and then, the repeated value is 0 (S555), the optimal behavior combination is selected as the behavior of a robot (S556) and when the repeated value is not 0, it returns to the step c).

h) When not satisfying the randomness (S557), it returns to the step c) without the subtraction of the repeated value. Whether to satisfy the randomness of the steps g) and h) may be performed according to the above Equation 3. Even though returning to the step c) without the subtraction of the repeated value is the case in which the step e) is never performed according to the determination result of Equation 6, it signifies that the step g) is necessarily performed. Therefore, when the step g) is not necessarily performed, the repeated value is subtracted in the step h) and it returns to the step c).

In the above description, the method for expressing feeling is reviewed. According to the described configuration, the optimal feeling expressions or the random feeling expressions that meet various and composite feelings can be performed.

However, there may be a gap between the previous feeling expression behavior and the current feeling expression in consideration of the random feeling expression. The gap between the above behaviors limits the natural feeling expressions and therefore, needs to be removed. Hereinafter, an apparatus and a method for expressing continued feelings in accordance with the embodiment of the present invention will be described below.

Figure 6:
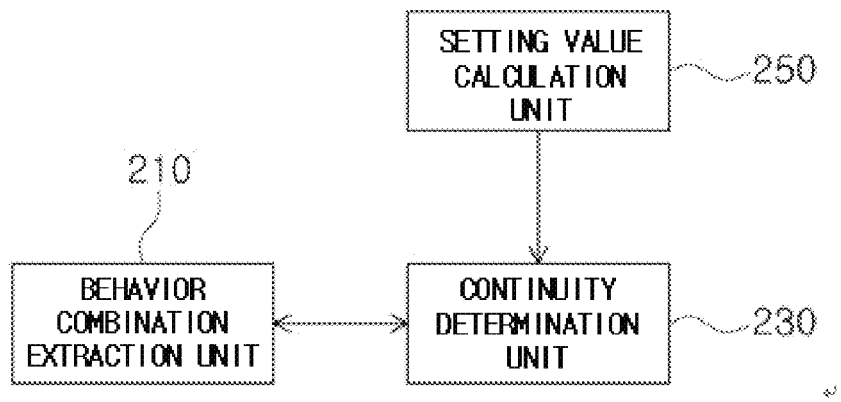
FIG. 6 is a schematic diagram illustrating an example in which the apparatus for selecting lasting feeling of a machine in accordance with the embodiment of the present invention may be applied to the apparatus for selecting feeling expression behaviors.

FIG. 6 is a block diagram illustrating the apparatus for selecting lasting feeling of a machine in accordance with the embodiment of the present invention.

The apparatus for selecting lasting feeling of a machine may includes a behavior combination extraction unit 220 that extracts behavior combinations expressing the feeling of a robot and a continuity determination unit 230 that determines whether the just previous behavior is the same as the current behavior for each expression element of a robot configuring the extracted behavior combinations and if it is determined that the just previous behavior is not the same as the current behavior in the element larger than the setting value, allows the behavior combination extraction unit 210 to extract a new behavior combination.

The behavior combination extraction unit 210 extracts the behavior combination that expresses the feeling of a robot. In this case, the extracted behavior combinations may be the behavior combination that is finally selected and is just before transferred to the control unit of each element of a robot and may be the behavior combination extracted during the process of selecting the behavior combinations. That is, the apparatus for extracting the feeling expression behaviors may be located at every place of output end of the apparatus that outputs the behavior combinations.

The continuity determination unit 230 extracts a new behavior combination when a difference between the extracted behavior combination $b_{can}(k)$ and a just previous behavior combination $b(k-1)$ is larger than the setting value. As a result, there is no gap between the just previous behavior and the current behavior by extracting the behavior combination having the change in behavior within the setting value based on the comparison with the just previous behavior combinations. That is, the continuity of the behaviors is maintained.

In detail, the continuity determination unit 230 may determine the continuity of the behavior according to the following Equation 8.

$$\text{count}(b(k-1), b_{can(k)}) \leq l \quad \text{[Equation 8]}$$

In the above Equation 8, $$\text{count}(b(k-1), b_{can}(k)) = \sum_{p=1}^{P} \text{comparison}(b_p(k-1), b_{canp}(k)),$$

$$\text{comparison}(b_p(k-1), b_{canp}(k)) = \begin{cases} 1, & \text{if } b_p(k-1) \neq b_{canp}(k) \\ 0, & \text{otherwise} \end{cases},$$

$b_p(k-1)$ is an feeling expression behavior of a p-th expression element in the behavior combination at the just previous time (k-1 time), $b_{can}(k)$ is an feeling expression behavior of a p-th expression element in the behavior combination of the current time (k time), and l is the setting value.

It is determined that the continuity is present when satisfying the above Equation 8 and it is determined that the continuity is not present when not satisfying the above Equation 8.

In accordance with the above configuration, the continuity of the behavior can be ensured. However, when the setting value is fixed, the feeling expression may be limited. For example, when the feeling value itself is not largely changed, there may be a considerable difference between the previous behavior combination and the current behavior combination. In this case, when the fixed setting value is used, the optimal feeling expression cannot be used due to the continuity. In order to prevent the phenomenon, the setting value may be fluidly changed in connection with the feeling value.

To this end, the apparatus for selecting lasting feeling may further include a setting value calculation unit 250 that calculates the setting value so as to be in proportion to the difference between the just previous feeling value and the current feeling value in the feeling value indicating the feeling of the robot.

In this case, the feeling value may be a composite feeling (vector) configured of a plurality of detailed feelings. In this case, the difference between the just previous feeling value and the current feeling value may be the largest value among the differences between the detailed feelings as in Equation 9.

$$d_{max} = \max\{d_1 d_2 \ldots d_j \ldots d_J\} \quad \text{[Equation 9]}$$

In the above Equation 9, J is a total number of detailed feelings that can be expressed.

$$d_j \| e_j(k-1) - e_j(k) \|,$$

ej(k−1) is a j-th detailed feeling value in the just previous feeling value, $e_j(k)$ is a j-th detailed feeling value in the current behavior value, and max { } is an operator that extracts a maximum value.

As such, when using the largest value among the differences between the detailed feelings, as the difference between the previous feeling value and the current feeling value is large, the probability that the previous feeling and the current feeling are different from each other is increased, such that various feeling expressions can be performed.

Further, the present invention is not necessarily limited to the use of the largest value among the differences between the detailed feelings as in the above Equation 9 and may use a value having the smallest difference between the detailed feelings. When using the smallest value, since the difference between the previous feeling value and the current feeling value is not large, the feeling having the high continuity between the previous feeling and the current feeling can be expressed.

As a result, the present invention may use any one of a maximum value, a minimum value, a middle value, an average value, or a value directly set by the user if necessary among the differences between the previous feeling values and the current feeling values Unlike the above Equation 9 for obtaining the maximum value, the operator used to obtain the minimum value, the middle value, or the average value may be changed.

In addition, the setting value may be in proportion to coefficients selected by a user. As the difference in the continuity of the behaviors occurs according to the coefficients, the difference in the behavior change to the feeling change occurs. This signifies that the characteristics of a robot (minimum reaction characteristics to feeling) may be given through the above coefficients.

Further, the setting value may be in proportion to the number of expression elements that perform the feeling expression behaviors. When the expression element performing the feeling expression behavior but the setting value is small, the feeling expression behavior has no choice but to be very limited. Therefore, it is preferable that the setting value is in proportion to the number of elements.

The setting value I may be represented by the following Equation 10 by reflecting the above description.

$$I = d_{max} \cdot P \cdot \phi \quad \text{[Equation 10]}$$

In the above Equation 10, P is a total number of elements.
φ is coefficients selected by a user.

Figure 7:
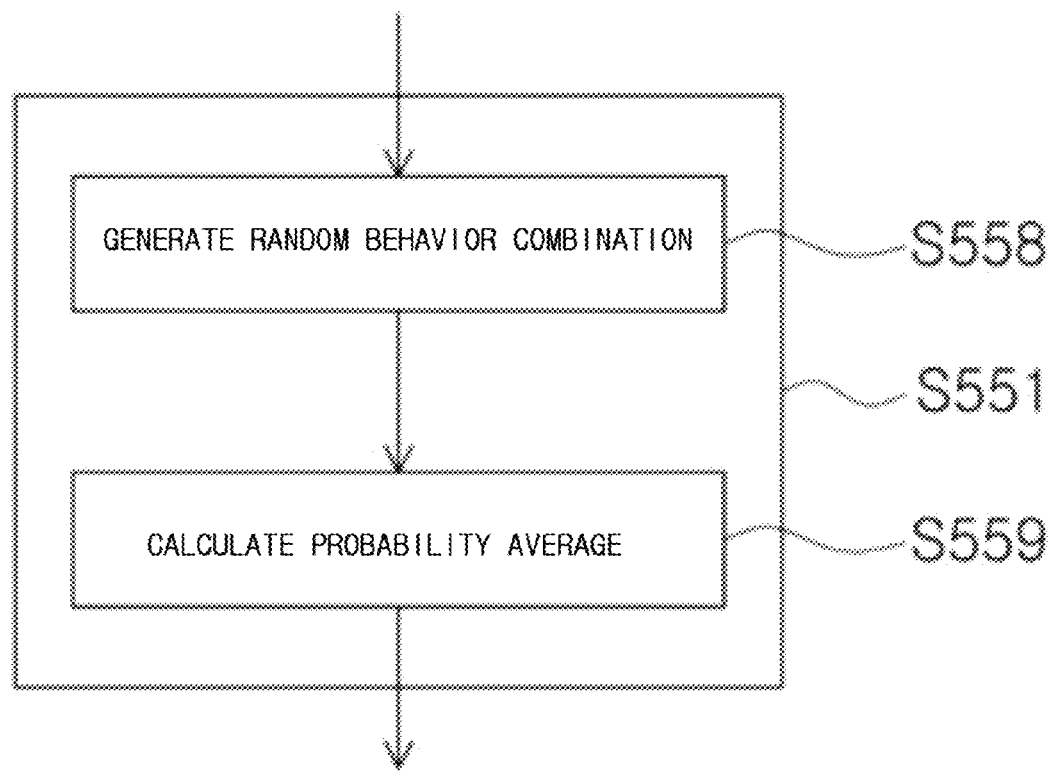
FIG. 7 is a block diagram illustrating the apparatus for selecting lasting feeling of a machine in accordance with the embodiment of the present invention.

FIG. 7 is a schematic diagram illustrating an example in which the apparatus for selecting lasting feeling of a machine in accordance with the embodiment of the present invention may be applied to the apparatus for selecting feeling expression behaviors of FIG. 2.

FIG. 7 illustrates the step of calculating the average of the probabilities (S551) of FIG. 5 that is sub-divided into the step of generating the random behavior combination (S558) and the step of calculating the average of probabilities (S559). The step of generating the random behavior combination (S558) is the step of generating the behavior combinations by randomly extracting the feeling expression behaviors one by one in the step of calculating the average of probabilities and the step of calculating the average of probabilities (S559) is the step of calculating the average of probabilities of the feeling expression behaviors included in the behavior combinations for each feeling.

The apparatus for selecting lasting feeling of a machine of FIG. 6 may be operated between the step of generating the random behavior combinations (S558) and the step of calculating the average of probabilities (S559). The apparatus for selecting lasting feeling of a machine may be located at every places of the output end in the step of outputting behavior combinations in FIG. 5 since the input value is the behavior combinations.

As set forth above, the apparatus for expressing continued expression in accordance with the embodiment of the present invention can ensure the continuity of the feeling expression behavior.

In particular, it is possible to perform the feeling expression to which the difference between the just previous feeling value and the current feeling value is adaptively reflected.

In addition, it is possible to perform the more realistic feeling expression by reflecting the reactivity to the number and feeling of feeling expression elements.

Meanwhile, it can be understood to a person with skilled in the art to which the present invention pertains that the present invention can be practiced in other detailed forms without changing the technical ideas or essential features of the present invention. Therefore, the foregoing embodiments are only by way of example and therefore, it is to be understood that the present invention is not limited to the foregoing embodiments. The scope of the present invention is defined by claims to be described rather than by the detailed description and it is to be construed that all the changes or modified forms derived from the meanings, scope, and equivalent concept of claims are included in the scope of the present invention.

What is claimed is:

1. An apparatus for selecting a feeling of a machine, the apparatus comprising:
   a processor;
   a feeling expression setting unit programmed to set a feeling vector of the machine, wherein the feeling vector comprises a plurality of feeling values;
   a behavior combination extraction unit programmed to generate an optimal behavior combination and a candidate behavior combination of the machine,
   wherein the optimal behavior combination is a current behavior combination currently expressed by the machine; and
   a continuity determination unit programmed to:
     when a size of a difference between the optimal behavior combination and the feeling vector of the machine is larger than a size of a difference between the candidate behavior combination and the feeling vector of the machine, replace the optimal behavior combination with the candidate behavior combination to express the feeling of the machine;
     when the size of the difference between the optimal behavior combination and the feeling vector of the machine is smaller than the size of the difference between the candidate behavior combination and the feeling vector of the machine, determine whether a current behavior expressed since a just previous time is same as a candidate behavior to be expressed for each feeling expression element of the machine; and
when a difference between the current behavior of the feeling expression elements and the candidate behavior of the feeling expression elements is larger than a setting value, allow the behavior combination extraction unit to extract a new candidate behavior combination.

2. The apparatus of claim 1, further comprising:
a setting value calculation unit programmed to calculate the setting value so as to be in proportion to a difference between each of the plurality of feeling values indicating the feeling of the machine expressed at a present time and each of the plurality of corresponding candidate feeling values indicating the feeling of the machine to be expressed.

3. The apparatus of claim 2, wherein
the difference between the current feeling values and the corresponding candidate feeling values is any one of a maximum value, a minimum value, an average value, an middle value, and a value set by a user among differences between the detailed feelings.

4. The apparatus of claim 2, wherein the setting value is in proportion to a coefficient selected by a user.

5. The apparatus of claim 2, wherein the setting value is in proportion to the number of feeling expression elements of the machine.

6. The apparatus of claim 1, wherein the difference between the current behavior of the feeling expression elements and the candidate behavior of the feeling expression elements is calculated according to the following Equation:

$$\text{count}(b(k-1), b_{can}(k)) \le l,$$

wherein:

$$\text{count}(b(k-1), b_{can}(k)) = \sum_{p=1}^{P} \text{comparison}(b_p(k-1), b_{can\,p}(k));$$

$$\text{comparison}(b_p(k-1), b_{can\,p}(k)) = \begin{cases} 1, & \text{if } b_p(k-1) \ne b_{can\,p}(k) \\ 0, & \text{otherwise} \end{cases};$$

$b_p(k-1)$ is an feeling expression behavior of a p-th feeling expression element in the behavior combinations of the feeling expression elements, which has been currently expressed since the just previous time (k−1 time);
$b_{can\,p}(k)$ is the feeling expression behavior of the p-th feeling expression element in the feeling expression elements, which is to be expressed at an immediate time (k time); and
l is the setting value.

7. A method for selecting a feeling of a machine, the method comprising:
setting a feeling vector of the machine, wherein the feeling vector comprises a plurality of feeling values;
generating an optimal behavior combination and a candidate behavior combination of the machine, wherein the optimal behavior combination is a current behavior combination currently expressed by the machine:
when a size of a difference between the optimal behavior combination and the feeling vector of the machine is larger than a size of a difference between the candidate behavior combination and the feeling vector of the machine, replacing the optimal behavior combination with the candidate behavior combination to express the feeling of the machine;
when the size of the difference between the optimal behavior combination and the feeling vector of the machine is smaller than the size of the difference between the candidate behavior combination and the feeling vector of the machine, determining whether a current behavior expressed since a just previous time is same as a candidate behavior to be expressed for each feeling expression element of the machine; and
when a difference between the current behavior of the feeling expression elements and the candidate behavior of the feeling expression elements is larger than a setting value, extracting a new behavior combination.

8. The method of claim 7, wherein the difference between the current behavior of the feeling expression elements and the candidate behavior of the feeling expression elements is calculated according to the following Equation:

$$\text{count}(b(k-1), b_{can}(k)) \le l,$$

wherein:

$$\text{count}(b(k-1), b_{can}(k)) = \sum_{p=1}^{P} \text{comparison}(b_p(k-1), b_{can\,p}(k));$$

$$\text{comparison}(b_p(k-1), b_{can\,p}(k)) = \begin{cases} 1, & \text{if } b_p(k-1) \ne b_{can\,p}(k) \\ 0, & \text{otherwise} \end{cases};$$

$b_p(k-1)$ is an feeling expression behavior of a p-th feeling expression element in the behavior combinations of the feeling expression elements, which has been currently expressed since the just previous time (k−1 time);
$b_{cap\,p}(k)$ is the feeling expression behavior of the p-th feeling expression element in the feeling expression elements, which is to be expressed at an immediate time (k time); and
l is a set value.

* * * * *